United States Patent Office 2,824,084
Patented Feb. 18, 1958

2,824,084

LIGHT-SENSITIVE, UNSATURATED POLYMERIC MALEIC AND ACRYLIC DERIVATIVES

Cornelius C. Unruh and Donald A. Smith, Rochester, N. Y., assignors to Eastman Kodak Company, Rochester, N. Y., a corporation of New Jersey No Drawing. Application May 26, 1955
Serial No. 511,417

16 Claims. (Cl. 260—64)

This invention relates to resinous esters and amides of linear polymers containing carboxyl or acid chloride groups such as polymeric acrylic acid chlorides and anhydrides, but more particularly maleic anhydride polymers, prepared by condensing said linear polymers with ω-hydroxyalkoxybenzaldehydes or aminobenzaldehydes or with certain derivatives of these aldehydes, and to processes for their preparations.

In the field of derived polymers, many valuable polymeric materials are inaccessible because they possess sensitive functional groups which are either destroyed or undergo undesirable side reactions under the conditions of their preparation. One such functional group is the aldehyde group, particularly in aromatic aldehydes exemplified by benzaldehyde. Such aromatic aldehydes are valuable compounds due to their intensive reactivity with a wide variety of compounds. For certain commercial applications it would be very desirable to provide soluble compounds combining therein the properties of the aromatic aldehydes with those of certain synthetic resins. Previous attempts to produce a soluble polymer of this kind have not been successful. For example, on polymerizing vinyl benzaldehyde the product is a hard resin which is insoluble in typical organic solvents (R. H. Wiley et al., J. Polymer Sci., 5, pages 483–486 (1950)). Unless such polymeric materials are soluble, it will be appreciated that their utility is of a very low order.

We have now found that soluble resinous materials containing an aromatic aldehyde group which is reactive can be prepared from aromatic aldehydes containing besides the aldehyde group, another functional group such as hydroxyl group or an amino group, for example, a hydroxyalkoxybenzaldehyde or an aminobenzaldehyde, by reacting the aromatic aldehyde with a polymer containing an acid chloride or an acid anhydride group, for example, with a maleic anhydride polymer. The resulting soluble polymer containing the aldehyde group can then be reacted with any reactant capable of reacting with benzaldehyde itself to give a wide range of technically useful polymeric products including dyes, dye couplers, etc., but more especially with an aromatic ketone such as, for example, an acetophenone to give soluble polymeric products containing ethylenic unsaturation which are light-sensitive and become insoluble on exposure to light, and which are eminently suitable for the production of resist images for printing plates.

The light-sensitive soluble polymeric products of our invention can also be prepared by a modified and preferred procedure comprising the steps of first reacting the hydroxyalkoxybenzaldehyde or the aminobenzaldehyde with the aromatic ketone to give the ethylenically unsaturated derivatives thereof and then reacting these derivatives, which still contain either the hydroxyl group or the amino group, with the polymeric acid chloride or the polymeric acid anhydride.

It is, accordingly, an object of our invention to provide a new class of resinous polymers. A further object is to provide compositions which are light-sensitive and particularly useful for photomechanical reproduction processes. Another object is to provide compositions containing sensitizers to improve the light sensitivity of the resinous polymers of the invention. Another object is to provide methods for preparing the new class of polymers and materials containing these polymers. Other objects will become apparent hereinafter.

The ultimate resinous polymers of our invention are characterized by containing a substantial proportion of at least one of the following recurring structural units:

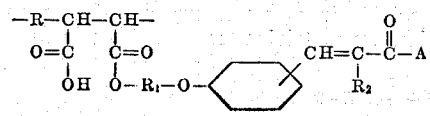

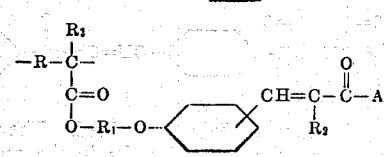

and

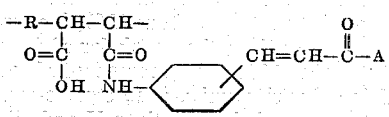

wherein R represents preferably a styrene unit, but can also be a vinyl ester unit, an isopropenyl ester unit, an alkyl acrylate or methacrylate unit, a vinyl alkyl ether unit or an ethylene unit, $R_1$ represents an alkylene group containing from 2 to 3 carbon atoms such as —$CH_2CH_2$— or —$CH_2CH_2CH_2$—, $R_2$ represents hydrogen, an alkyl group of 1 to 4 carbon atoms, a nitro group, a cyano group or a —$COOR_4$ group, $R_3$ represents hydrogen or an alkyl group of from 1 to 4 carbon atoms, and A represents a monovalent group such as —OH, —$R_4$, —$OR_4$, —$COOR_4$, —CH=CH—$C_6H_4$—$OR_4$, —$C_6H_4$—$C_6H_5$ and the group

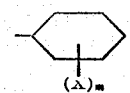

wherein $m$ is 1 or 2 and X represents a hydrogen atom, a halogen atom, e. g. chlorine or bromine, a nitro group, a cyano group, an —$R_4$ group, an —$OR_4$ group, a —COOH group, a —$COOR_4$ group, a —$CONH_2$ group or an $$-N\begin{matrix}R_4\\ \\R_4\end{matrix}\ \text{group}$$

and wherein $R_4$ in each instance represents an alkyl group containing from 1 to 4 carbon atoms.

The steps of the preferred process for preparing the new class of resinous polymers of the invention are illustrated by the following reaction equations wherein, for example, an ω-hydroxyalkoxybenzaldehyde is reacted with an acetophenone, followed by reaction of the above condensation product with for example, a styrene-maleic anhydride copolymer:

(I)

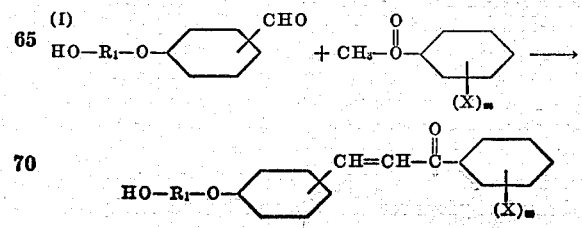

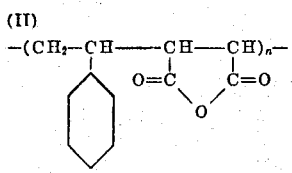
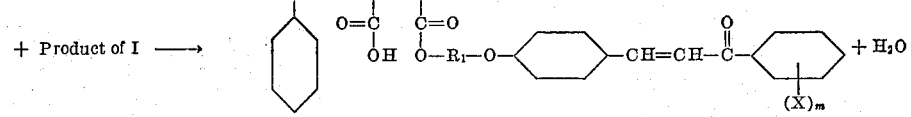
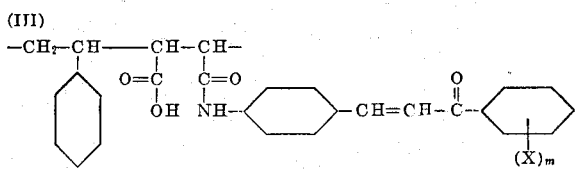

wherein $n$ represents a whole number indicating that the group is a recurring unit, $R_1$, $m$ and $X$ are as previously defined. The monoester products represented by the product of the above Equation II are preferred. When aminobenzaldehydes such as p-aminobenzaldehyde are substituted for the ω-hydroxyalkoxybenzaldehyde in the above reaction equations, the resulting polymeric products are also soluble in common organic solvents and are characterized by containing the recurring structural unit:

(III)

where in $m$ and $X$ are as previously defined. The proportions of the recurring structural units in the respective products of Equations II and III can vary in each polymer molecule from about 20% to about 99%, i. e. up to substantially 100%, by weight, the remainder of the molecule to make up a total of 100% being composed of hydrolyzed styrene-maleic anhydride units, i. e., styrene-maleic acid units. The styrene unit in Equations II and III, as previously indicated, can be replaced by any one of the units represented by R.

In the above described processes, the condensation of the selected aromatic aldehyde and the selected aromatic ketone is carried out in approximately equimolar proportions, though an excess of one or the other of the reactants can also be employed, preferably in an aqueous alcoholic solution of an alkali metal hydroxide such as sodium or potassium hydroxide, at a temperature of from 20°–100° C. The reaction of the hydroxyl or amino group containing compounds prepared as above, with the maleic anhydride polymer is also carried out in about equimolar proportions, but it is also within the scope of the invention to vary the proportions over a relatively wide range, say from about 0.10–1.50 moles of the hydroxy or amino component to each mole of the maleic anhydride polymer, thereby obtaining variable amounts of the specified units in each polymer molecule. Preferably, the reaction is carried out at elevated temperatures in a liquid nitrogen base compound such as pyridine, but other solvents may be used also. The products of these reactions can be separated from their reaction mixtures by conventional methods, for example, by crystallization, extraction, etc. of the non-polymeric products and by precipitation, extraction, etc. of the polymeric products.

Suitable aminobenzaldehydes and hydroxyalkoxybenzaldehydes that can be employed in the practice of our invention include aminobenzaldehydes wherein the amino group contains at least one free hydrogen atom such as o-aminobenzaldehyde, m-aminobenzaldehyde, p-aminobenzaldehyde and their various alkyl nuclear-substituted derivatives, ω-hydroxyalkoxybenzaldehydes such as 2-β-hydroxyethoxybenzaldehyde, 3-β-hydroxyethoxybenzaldehyde, 4-β-hydroxyethoxybenzaldehyde, 2-γ-hydroxypropoxybenzaldehyde, 3-γ-hydroxypropoxybenzaldehyde, 4-γ-hydroxypropoxybenzaldehyde, 4-(β-hydroxyethoxy)-3-methoxybenzaldehyde, 4-(γ-hydroxypropoxy)-3-methoxybenzaldehyde, etc. and their various other alkyl nuclear-substituted derivatives. The hydroxyalkoxy benzaldehydes mentioned above can be prepared by the general process described by J. Bernstein et al., J. Amer. Chem. Soc., 73, pages 906–912 (1951) wherein a hydroxybenzaldehyde is reacted with an alkylene halohydrin such as ethylene chlorohydrin, 3-bromopropanol, etc. in the presence of an aqueous alkali hydroxide.

Suitable ketones or other compounds containing activated methyl or methylene groups that can be reacted with the above aldehydes include acetone, acetophenone and nuclear-substituted acetophenones such as haloacetophenones, e. g. p-bromoacetophenone, p-chloroacetophenone, m-nitroacetophenone, p-phenylacetophenone, anisalacetone, benzalacetone, cinnamalacetone, malonic acid, malonic acid esters such as ethyl hydrogen malonate, succinic acid esters, acetic anhydride, pyruvic acid, acetoacetic acid and alkyl esters thereof, cyanoacetic acid and alkyl esters thereof, methyl benzoylacetate, benzoylacetonitrile, p-nitrophenyl acetic acid, hydantoin, thiohydantoin, acetoaldehyde, acetylacetone, homophthalic acid and esters, thionaphthenone, thioindoxyl, pyrimidazolone, coumaranone, barbituric acid and thiobarbituric acid, 1,3 indandione, N-alkyl oxindoles, 3-phenylisoxazolone, rhodanines, thiazolidones, thiazolidindiones, etc. Those of the above compounds coming within the general formula, $R_2CH.CO.A$, wherein $R_2$ and $A$ are as above, are preferred.

Suitable maleic anhydride polymers that can be employed in our invention include various copolymers of maleic anhydride, preferably approximately 1:1 copolymers of styrene and maleic anhydride, but other approximately 1:1 copolymers of maleic anhydride are also operable such as, for example, vinyl acetate-maleic anhydride copolymers, isopropenyl acetate-maleic anhydride copolymers, alkyl acrylate or methacrylate-maleic anhydride copolymers wherein the alkyl group in each instance contains from 1 to 4 carbon atoms such as methyl acrylate-maleic anhydride, methyl methacrylate-maleic anhydride etc. copolymers, vinyl alkyl ether-maleic anhydride copolymers such as vinyl methyl ether-maleic anhydride, vinyl butyl ether-maleic anhydride, etc. copolymers, ethylene-maleic anhydride copolymers, and the like. Furthermore, certain other polymers may be substituted for the maleic anhydride copolymers such as homopolymers and copolymers of acrylic and alkylacrylic anhydrides, the homopolymers and copolymers of acrylyl chloride and fumaryl chloride.

Most of the polymeric products of our invention are soluble in one or more common organic solvents such as acetone, dioxane, methyl ethyl ketone, pyridine, methyl Cellosolve, ethyl Cellosolve, Cellosolve esters, chlorinated hydrocarbons, etc. Such solutions are useful for various purposes such as for sizing of fibrous materials, the polymer being converted to the insoluble form on exposure of the sized or impregnated material to actinic light. They are also useful for the coating of various surfaces, and are more especially useful, because of their light-sensitivity, for forming resist images on printing plate supports such as on aluminum, zinc, copper and magnesium and various alloys thereof. When coatings of the polymers on such supports are light-exposed to a subject such as a line, halftone or continuous tone image, the coatings are rendered insoluble in organic solvents in the area of exposure, and the unexposed area can then be readily removed with one or more of the above-mentioned solvents. Advantageously, sensitizing agents can be incorporated into the solutions of polymer to improve light-sensitivity and, accordingly, reduce the required time of exposure. A suitable sensitizing agent, for example, is 2-benzoylmethylene-1-methyl-β-naphthothiazoline. The resulting relief image of insoluble polymer can then be used as a plate etching resist or if prepared on a lithographic surface such as zinc, surface-hydrolyzed cellulose ester, casein, etc., the relief image can be inked and printed onto paper, etc. on a lithographic or other printing press.

The invention is illustrated further by the following examples of certain preferred embodiments thereof.

*Example 1.—4(γ-hydroxypropoxy) benzaldehyde*

To a mixture of 427 g. of p-hydroxybenzaldehyde and 400 g. of water was added a cooled solution of 145 g. of sodium hydroxide in 200 cc. of water. A further 200 cc. of water was added and the mixture warmed on a steam bath until solution was complete. To this, there were then added 487 g. of 3-bromopropanol and the resulting brown solution was heated on the steam bath. In about 15–20 minutes, the mixture became turbid and soon thereafter an oil floated to the top of the reaction mixture. The mixture was heated a total of 6 hours on the steam bath with frequent shaking. The supernatant oily layer was then separated and distilled under high vacuum. The product, 4-(γ-hydroxypropoxy)benzaldehyde, distilled at 100° C. at a mercury pressure of 8 microns. Analysis of this product gave by weight 66.7% of carbon and 6.7% of hydrogen compared with calculated theory of 67.1% and 6.9%, respectively, which indicated that a relatively pure 4-(γ-hydroxypropoxy)benzaldehyde had been obtained.

In place of the 3-bromopropanol in the above example, there can be substituted an equivalent amount of other haloalkanols, such as, for example, ehtylene chlorohydrin, trimethylene chlorohydrin, etc. and in place of the p-hydroxybenzaldehyde there can be substituted a like amount of other hydroxybenzaldehydes such as o-hydroxybenzaldehyde or m-hydroxybenzaldehyde to give corresponding ω-hydroxyalkoxybenzaldehydes.

*Example 2.—Reaction product of 4-(β-hydroxyethoxy) benzaldehyde with styrene-maleic anhydride copolymer*

(a) A solution of 10 g. (approx. 0.05 mols) of a 1:1 styrene-maleic anhydride copolymer in 30 cc. of dry pyridine was treated with 9.5 g. (approx. 0.06 mol.) 4-(β-hydroxyethoxy)-benzaldehyde in 10 cc. of dry pyridine. The reaction mixture was heated two hours on a steam bath, then diluted with about 40 cc. of pyridine and poured into a larger volume of dilute aqueous acetic acid. The solid product obtained as a precipitate was purified by dissolving in acetone and reprecipitating in water, followed by washing with water and drying at 40° C. A yield of 12.5 g. of polymer was obtained which consisted of the following recurring structural units:

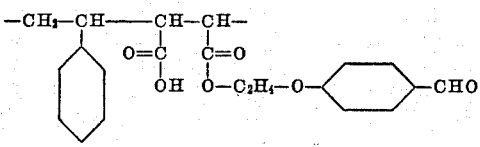

The polymer was found to be reactive with acetophenone to give a light-sensitive benzal derivative consisting of the recurring structural unit:

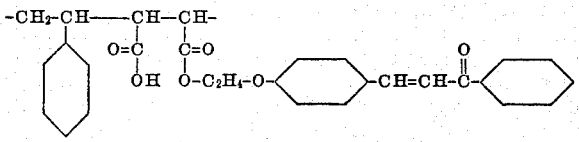

The latter product can also be prepared as set forth in Equations I and II by substituting for the 4(β-hydroxyethoxy) benzaldehyde in the above example 4-hydroxyethoxybenzalacetophenone.

(b) To 100 g. of a 10 percent solution of a styrene-maleic anhydride copolymer in dry pyridine was added 10 g. of 4-(β-hydroxyethoxy)benzaldehyde and the solution heated on a steam bath under anhydrous conditions for two hours. The product was poured into 3 liters of agitated distilled water containing 100 ml. of concentrated hydrochloric acid. The tan, fibrous precipitate was thoroughly washed with distilled water and dried at 40° C. The product contained 1.3 millimoles of aldehydes per gram of polymer and was soluble in dilute ammonium hydroxide solution. The polymer was found to be reactive with acetophenone to give a light-sensitive benzal derivative similar to that of above (a). In place of the 4-(β-hydroxyethoxy)benzaldehyde in the above examples, there can be substituted an equivalent amount of various nuclear substituted chloro and methyl group derivatives thereof to give resinous polymers having similar structures and generally similar properties.

*Example 3.—Reaction product of 4-(γ-hydroxypropoxy) benzaldehyde with styrene-maleic anhydride copolymer*

The procedure of Example 2(b) was repeated except that 4-(γ-hydroxypropoxy)benzaldehyde was substituted for the 4-(β-hydroxyethoxy)benzaldehyde. A polymer similar in appearance to that of Example 2(b) was obtained. It contained 1.3 millimoles of aldehyde per gram of polymer and was soluble in dilute ammonium hydroxide solution. It likewise was reactive with acetophenone to give the corresponding light-sensitive benzal derivative thereof.

The light-sensitive benzal derivative can also be prepared by substituting for the 4-(γ-hydroxypropoxy) benzaldehyde in the above example 4-hydroxypropoxybenzalacetophenone.

*Example 4.—Reaction product of 4-(γ-hydroxypropoxy) benzaldehyde with polymethacrylic anhydride*

10 g. of polymethacrylic acid were dissolved in 90 cc. of dry pyridine and 12.5 g. of 4-(γ-hydroxypropoxy)benzaldehyde was added. The resulting solution was heated on the steam bath under anhydrous conditions for 3 hours, then poured into 3 liters of agitated distilled water containing 100 cc. of concentrated hydrochloric acid. The fibrous precipitate was washed thoroughly with distilled water and dried. The polymer was redissolved in a mixture of acetone and water, and the solution poured into a large volume of distilled water. A tan, friable powder was obtained on drying which contained 1.6 millimoles of aldehyde group per gram of polymer. The polymer was reactive with acetophenone to give the corresponding light-sensitive benzal derivative.

*Example 5.—4-hydroxyethoxybenzal-4'-bromoacetophenone*

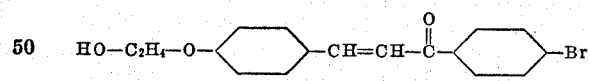

A solution containing 16.6 g. (0.1 mol.) of 4-(β-hydroxyethoxy)benzaldehyde, 18.3 g. (0.09 mol.) of p-bromoacetophenone and 1 cc. of 10% aqueous sodium hydroxide in 25 cc. of ethanol was allowed to stand overnight at room temperature. The mixture was filtered and the solid was recrystallized from ethanol, yielding 19.3 g. of yellow crystals, M. P. 129°–131° C. Analysis of this product gave by weight 58.9% of carbon, 4.32% of hydrogen and 23.0% of bromine compared with calculated theory for 4-hydroxyethoxybenzal-4'-bromoacetophenone of 59.1%, 4.7% and 23.1%, respectively.

*Example 6.—Reaction product of 4-hydroxyethoxybenzal-4'-bromoacetophenone with styrene-maleic anhydride copolymer*

A solution of 6 g. (approx. 0.03 mol.) of a 1:1 styrene-maleic anhydride copolymer in 50 cc. of dry pyridine was treated with 7 g. (approx. 0.02 mol.) of 4-β-hydroxyethoxybenzal-4'-bromoacetophenone in 10 cc. of pyridine. The solution was heated on the steam bath for 3 hours, then poured into dilute aqueous acetic acid and the precipitate collected and dried at 40° C. A yield of 11.3 g. of the polymeric product was obtained. It contained 7.4% by weight of bromine. This result indicates that the product obtained contained approximately 51% by weight of the recurring structural unit:

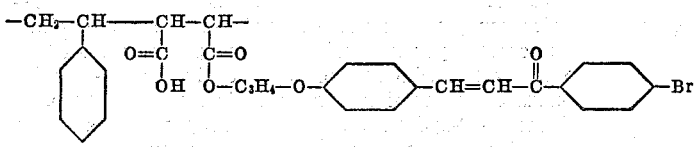

the remainder being hydrolyzed styrene-maleic anhydride units, i. e. styrene-maleic acid units.

*Example 7.—4-hydroxyethoxybenzalanisalacetone*

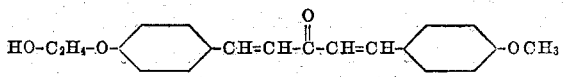

A solution of 16.6 g. (0.1 mol.) of 4-(β-hydroxyethoxy)benzaldehyde and 17.6 g. (0.1 mol.) of anisalacetone [4(p-methoxyphenyl)-3-buten-2-one] in 30 cc. of ethanol was treated with 1 cc. of 10% aqueous sodium hydroxide and kept at room temperature for 4 hours, then in a refrigerator for several days. The yellow solid which had formed was collected and recrystallized from ethanol. A yield of 17.1 g., M. P. 120°–130° C., was obtained. Analysis of the product gave by weight 74% of carbon and 6.2% of hydrogen compared with calculated for $C_{20}H_{20}O_4$ of 74.6% and 6.3%, respectively.

*Example 8.—Reaction product of 4-hydroxyethoxybenzalanisalacetone with styrene-maleic anhydride copolymer*

A mixture of 3 g. of an approximately 1:1 styrene-maleic anhydride copolymer and 3.5 g. of 4-hydroxyethoxybenzalanisalacetone in pyridine was treated as in Example 4 to give a polymeric product which was light-sensitive, becoming insoluble in acetone, methyl ethyl ketone, etc. on exposure to light.

*Example 9.—Reaction product of 4-hydroxyethoxybenzalanisalacetone with isopropenyl acetate-maleic anhydride copolymer*

To a solution of 10 grams (0.05 moles) of an isopropenyl acetate-maleic anhydride copolymer dissolved in 50 ml. of dry pyridine was added 1.6 grams (0.005 moles) of 4-hydroxyethoxybenzalanisalacetone and the stirred solution was heated on the steam bath for two hours. The resulting solution was poured into a large volume of dilute hydrochloric acid and then thoroughly washed with distilled water. The dried polymer was soluble in dilute ammonium hydroxide solution and in acetone containing some water.

A coating of this polymer on a surface-hydrolyzed cellulose acetate sheet when exposed to a source of ultraviolet light through a photographic negative then developed in dilute ammonium hydroxide solution gave a stencil of insolubilized polymer corresponding to the image on the negative.

*Example 10.—Reaction product of 4-hydroxyethoxybenzalanisalacetone with polymethacrylic anhydride*

A mixture of 3.1 g. of polymethacrylic anhydride and 25 cc. of dry pyridine and 2.8 g. of 4-hydroxyethoxybenzalanisalacetone was heated on a steam bath for 2 hours under anhydrous conditions. The resulting solution was poured into a large volume of agitated dilute acetic acid, and the yellow, fibrous polymer which precipitated was washed thoroughly with distilled water and dried. A yield of 5 g. of the reaction product were obtained. It was soluble in moist methyl ethyl ketone.

A 1% solution of this polymer in methyl ethyl ketone (containing 3% of water) was coated on grained aluminum sheet and evaluated sensitometrically. It had a speed of 200 times that of unsensitized polyvinyl cinnamate.

*Example 11.—4-hydroxyethoxycinnamic acid*

A mixture containing 16.6 g. of 4-(β-hydroxyethoxy)-benzaldehyde, 10.4 g. of malonic acid, 17.0 g. of piperidine and 50 cc. of ethanol was heated for 3 hours on the steam bath in an open flask. At the end of this time, the evolution of gas had practically ceased. The residue was diluted with 50 cc. of water and the product precipitated by the addition of dilute aqueous hydrochloric acid. After recrystallization from dilute ethanol the product melted at 188°–191° C. Analysis gave by weight 63.5% of carbon and 5.8% of hydrogen compared with calculated theory for $C_{11}H_{12}O_4$ of 63.6% and 5.8%, respectively.

*Example 12.—Reaction product of 4-hydroxyethoxycinnamic acid with styrene-maleic anhydride copolymer*

A solution of 3 g. of an approximately 1:1 styrene-maleic anhydride copolymer in 25 cc. of pyridine was combined with 3 g. of 4-hydroxyethoxycinnamic acid in 10 cc. of pyridine, and heated on a steam bath for 5 hours. The resultant solution was poured into dilute aqueous acetic acid and the white, fibrous precipitate obtained was washed with water and dried. Analysis of this product indicated that it consisted of a substantial proportion (more than 50% by weight) of the recurring structural unit:

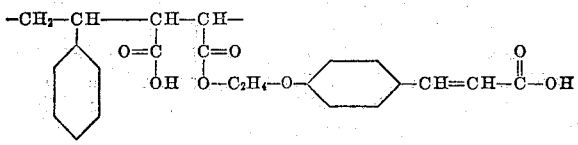

the remainder of the molecule being hydrolyzed styrene-maleic anhydride units.

A sample of the above product was dissolved in methyl ethyl ketone and coated onto a photographic quality of paper. On exposure of the coated paper to ultraviolet light under a half-tone negative and development in methyl ethyl ketone, a perceptible resist image was formed. Another coated sample was developed in dilute aqueous ammonia. Under these conditions, the unsensitized polymer had a speed of about 50, but when sensitized with 2-benzoylmethylene-1-methyl-β-naphthothiazoline it had a speed of 100.

*Example 13.—Ethyl 4-hydroxyethoxycinnamate*

A solution containing 24.1 g. of ethyl hydrogen malonate, 15.1 g. of 4-(β-hydroxyethoxy)benzaldehyde and 1.1 cc. of piperidine in 45 cc. of pyridine was heated on a steam bath for 6 hours. The solution was then concentrated under vacuum to a syrup. Since an attempted distillation of a portion of this material led to decomposition, the crude product of ethyl 4-hydroxyethoxycinnamate was used directly in subsequent experiments.

*Example 14.—Reaction product of ethyl 4-hydroxyethoxycinnamate with styrene-maleic anhydride copolymer*

A solution of 3 g. of an approximately 1:1 copolymer of styrene and maleic anhydride in 25 cc. of pyridine was combined with 9.5 g. of crude ethyl 4-hydroxyethoxycinnamate, prepared as described in Example 9, and the whole heated on a steam bath for 6 hours. The resultant solution was poured into dilute aqueous acetic acid and the precipitate formed was washed with water and dried.

The product consisted of a substantial proportion of the recurring structural unit:

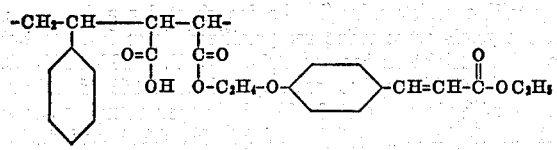

the remainder of the molecule being hydrolyzed styrene-maleic anhydride units.

The above prepared product was soluble in methyl ethyl ketone, but a coating of this polymer on exposure to ultraviolet light became insoluble in this solvent. It had a speed of about 100 when unsensitized, but when sensitized by the addition of 2-benzoylmethylene-1-methyl-β-naphthothiazoline it had a speed of about 1500.

*Example 15.—4 - hydroxyethoxybenzal - 3' - nitroacetophenone*

A solution containing 16.6 g. of 4-(β-hydroxyethoxy)-benzaldehyde and 16.5 g. of m-nitroacetophenone in 30 cc. of ethanol was treated with 2 cc. of 10% aqueous sodium hydroxide. After standing one hour, the mixture had deposited a heavy yellow precipitate which was collected and recrystallized from ethanol. A yield of 10 g. of polymer of M. P. 140°–142° C. was obtained. Analysis of this product gave by weight 65.3% of carbon, 4.8% of hydrogen and 4.5% of nitrogen compared with calculated for $C_{17}H_{15}NO_5$ of 65.6%, 4.6% and 4.2%, respectively.

*Example 16.—Reaction product of 4-hydroxyethoxybenzal-3'-nitroacetophenone with styrene-maleic anhydride copolymer*

To a solution of 3 g. of an approximately 1:1 styrene-maleic anhydride copolymer in 20 cc. of dry pyridine, there were added 4 g. of 4-hydroxyethoxybenzal-3'-nitroacetophenone in 10 cc. of pyridine. The solution was heated on a steam bath for 4 hours, then poured into a large volume of dilute aqueous acetic acid. The fibrous precipitate, after washing with water and drying, was soluble in methyl ethyl ketone and on coating from this solution was found to give a negative image on exposure to ultraviolet light through a positive image film.

*Example 17.—4-hydroxyethoxy-α-cyanocinnamic acid*

A solution containing 16.6 g. of 4-(β-hydroxyethoxy)-benzaldehyde, 8.5 g. of cyanoacetic acid and 8.5 g. of piperidine in 50 cc. of ethanol was allowed to stand overnight at room temperature. Most of the ethanol was then distilled under vacuum and the residue taken up with 30 cc. of water and acidified with concentrated hydrochloric acid. The yellow precipitate was collected, washed and recrystallized from ethanol. A yield of 12 g. of product, M. P. 204°–208° C. was obtained. Analysis of this product gave by weight 61.8% of carbon, 4.7% of hydrogen and 6.0% of nitrogen compared with calculated for $C_{12}H_{11}NO_4$ of 62.7%, 4.8% and 5.8%, respectively.

*Example 18.—Reaction product of 4-hydroxyethoxy-α-cyanocinnamic acid with styrene-maleic anhydride copolymer*

To a solution of 3 g. of an approximately 1:1 copolymer of styrene and maleic anhydride in 25 cc. of dry pyridine, there were added 4 g. of 4-hydroxyethoxy-α-cyanocinnamic acid in 15 cc. of pyridine. The reaction mixture was heated on a steam bath for 6 hours, then poured into dilute aqueous acetic acid. The fibrous product obtained was washed with several changes of water and dried. It consisted of a substantial proportion of the recurring structural unit:

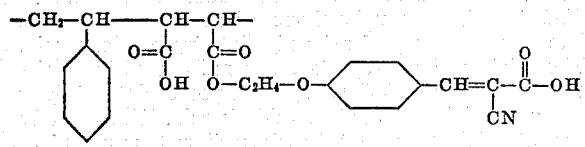

the remainder of the molecule being hydrolyzed styrene-maleic anhydride units.

A small sample of the above product was dissolved in methyl ethyl ketone, coated on a photographic stock paper and exposed to ultraviolet light under a negative image. Development with methyl ethyl ketone gave an easily perceptible positive image which was receptive to printing ink and readily transferred the image to paper placed in contact therewith. Another sample was similarly coated, exposed and developed in dilute ammonium hydroxide solution.

*Example 19.—4-hydroxyethoxybenzal-4'-phenylacetophenone*

A mixture of 16.6 g. of 4-(β-hydroxyethoxy)benzaldehyde and 17.5 g. of p-phenylacetophenone was heated until solution was complete, then treated with 2 cc. of 10% aqueous sodium hydroxide. The solution on standing overnight deposited a solid which was collected and recrystallized with ethanol, yielding 13.2 g. of yellow crystals, M. P. 170°–173° C. Analysis of this product gave by weight 80.3% of carbon and 5.8% of hydrogen compared with calculated for $C_{23}H_{20}O_3$ of 80.1% and 5.7%, respectively. When this product was combined with a 1:1 styrene-maleic anhydride copolymer in the manner described in the preceding examples, the product obtained had an unsensitized speed of 500 and readily gave hard and tough resist images when a coating thereof was light exposed to a half-tone image.

*Example 20.—4-(β-hydroxyethoxy)benzalpyruvic acid*

To a cooled (0° C.) mixture of 20 g. of pyruvic acid and 150 cc. of 10% aqueous sodium hydroxide solution there were added with vigorous stirring 41.5 g. of 4-(β-hydroxyethoxy)benzaldehyde. In about 15 minutes, the reaction mixture solidified and it was allowed to stand overnight. The reaction product was collected and sucked down on a Büchner funnel. It was then dissolved in 200 cc. of hot water and the solution filtered. The filtrate was acidified with hydrochloric acid, and the free acid product which precipitated was recrystallized from hot water, M. P. 152–154° C. Analysis of this product gave by weight 61.7% of carbon and 5.2% of hydrogen compared with calculated for $C_{12}H_{12}O_5$ of 61.1% and 5.1%, respectively.

*Example 21.—Reaction product of 4-(β-hydroxyethoxy)-benzalpyruvic acid with polymethacrylic anhydride*

A mixture of 4.6 g. of polymethacrylic anhydride, 25 cc. of dry pyridine and 3.6 g. of 4-(β-hydroxyethoxy)-benzalpyruvic acid was heated on a steam bath under anhydrous conditions for 2 hours. The reaction solution was poured into a large volume of well-agitated dilute acetic acid. The yellow-brown colored, fibrous polymer which precipitated was thoroughly washed with distilled water and dried. It was soluble in dilute ammonium hydroxide solution. A coating was made from this polymeric product using a 0.5% solution of it in very dilute ammonium hydroxide and this was found to be 65 times faster than unsensitized polyvinyl cinnamate.

*Example 22.—Reaction of 3-aminobenzalacetophenone with a styrene-maleic anhydride copolymer*

Two grams of a dried styrene-maleic anhydride copolymer was dissolved in 10 ml. of dry pyridine. To this solution was added a slurry of 4.5 grams of 3- aminobenzalacetophenone in 15 ml. of dry pyridine. The mixture was heated on the steam bath for four hours, diluted with an equal volume of acetone and poured into a large excess of agitated dilute hydrochloric acid. The bright yellow precipitate was redissolved in a mixture of acetone and dioxane, again poured into distilled water containing a little hydrochloric acid. The polymer was reprecipitated a third time from dioxane solution into distilled water, washed well with distilled water and dried at 40° C. Four grams of a friable yellow polymer was obtained which contained 4.1% nitrogen.

A coating of this polymer was made on surface hydrolyzed cellulose acetate sheet, and the coating was exposed through a negative to ultraviolet light. The exposed coating was developed with methyl ethyl ketone to give a stencil image which corresponded to the image on the negative.

In preparing the soluble polymers of the invention, it is not always necessary to have a free aldehyde group present. For example, it may be present as a derivative from which the free aldehyde group is readily available or is generated during a specific reaction. For instance, the aldehyde may be present as an acetal or a diacylate; in the former the free aldehyde becomes available for reaction purposes in acid media (such as in acid catalyzed reactions) and the latter may be treated with alkaline or acidic reagents to generate the aldehyde. This is an effective way to handle aminobenzaldehydes since they are somewhat unstable. By condensing the amino group (in the case of the mentioned amino derivatives with maleic anhydride polymers) with an anhydride or acid chloride group first, the aldehyde group can then be generated from its acetal.

By proceeding in accordance with the processes described in the preceding description and examples, other valuable polymers which are soluble and useful for the preparation of dyes, dye couplers and resist images can also be prepared. For example, the mentioned $\omega$-hydroxyalkoxybenzaldehydes and the aminobenzaldehydes are capable of condensing with a variety of compounds containing nitrogen such as aniline, hydroxylamine, hydrazine phenylhydrazine, methoxyamine, 1-amino-guanidine, semicarbazide, benzoic acid hydrazide, aminosulfonic acid, etc. Thus, when 4-$\beta$-hydroxyethoxybenzaldehyde is condensed with, for example, aniline the product has the structural formula:

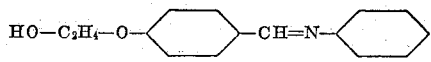

This and similar compounds prepared with any of the above-mentioned nitrogen-containing reactants can likewise be reacted with maleic anhydride polymers, polymer acrylic acid chlorides or anhydrides, etc. to give generally similar soluble polymeric esters and amides.

The $\omega$-hydroxyalkoxylbenzaldehydes of our invention are capable of condensing also with still other compounds containing an active methyl or methylene group such as 2,4-dinitrotoluene, 2,4,6-trinitrotoluene, nitromethane, phenylnitromethane, acetonitrile, benzylcyanide, phthalide, anthrone, fluorene, cyclopentadiene, 2- and 4-methyl-pyridine and their quaternary salts, 2- and 4-methylquinolines and their quaternary salts, 2-methyloxazoles and their quaternary salts, 2-methylthiazoles and their quaternary salts, 2-methylimidazoles and their quaternary salts, and the like. All these condensation products are also capable of condensing further with maleic anhydride polymers, acrylic and methacrylic anhydride polymers, etc. to give soluble light-sensitive polymers. For example, 2,4-dinitrotoluene condensation products and polymers thereof are illustrated by the following examples.

*Example 23.—4-($\beta$-hydroxyethoxy)-2',4'-dinitrostilbene*

A mixture of 45 g. of 2,4-dinitrotoluene, 39 g. of 4-($\beta$-hydroxyethoxy)benzaldehyde, 1 cc. of piperidine and 20 cc. of benzene was heated on a steam bath under reflux for 24 hours. The dark brown, tarry mass became crystalline on standing in the ice chest for a few days. The crystals were twice recrystallized from hot alcohol to give bright-orange crystals, M. P. 118°–119° C. Analysis of this product gave by weight 58.6% of carbon, 4.6% of hydrogen and 8.8% of nitrogen compared with calculated for $C_{16}H_{14}O_6N_2$ of 58.2%, 4.2% and 8.5%, respectively. It may be represented by the following structural formula:

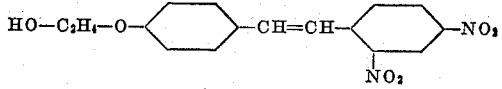

*Example 24.—Reaction product of 4-($\beta$-hydroxyethoxy)-2',4'-dinitrostilbene with styrene-maleic anhydride copolymer*

To 100 g. of a 10% solution of an approximately 1:1 styrene-maleic anhydride copolymer in dry pyridine, there were added 16 g. of 4-($\beta$-hydroxyethoxy)-2',4'-dinitrostilbene, and the orange solution thereof was heated on a steam bath for 2 hours under anhydrous conditions. Then 3 cc. of distilled water was added and the solution heated for another 15 minutes. It was then poured into a large volume of agitated methanol containing 100 cc. of glacial acetic acid. The bright-orange gummy polymer which precipitated was collected, redissolved in acetone, reprecipitated in a large volume of agitated distilled water and collected as a bright-orange polymer. This material showed a sensitometric speed of about 10 times that of unsensitized polyvinyl cinnamate.

*Example 25.—Reaction product of 4-($\beta$-hydroxyethoxy)-2',4'-dinitrostilbene with polymethacrylic anhydride*

3 g. of polymethacrylic anhydride were dissolved in 17 g. of dry pyridine on warming, and to the solution there were added 6 g. of 4-($\beta$-hydroxyethoxy)-2',4'-dinitrostilbene to give an orange solution which was heated and stirred on a steam bath for 2 hours. Then 1.5 cc. of water were added and the heating continued for another 15 minutes. The solution was poured into a large volume of agitated methanol containing sufficient glacial acetic acid to neutralize all of the pyridine. The soft, gummy polymer which precipitated was redissolved in acetone and poured into a large volume of agitated distilled water. The orange colored, fibrous precipitate was dried at room temperature. This material showed a sensitometric speed twice that of unsensitized polyvinyl cinnamate.

We claim:

1. A resinous polymer consisting of from about 20% to substantially 100% by weight of the recurring structural unit:

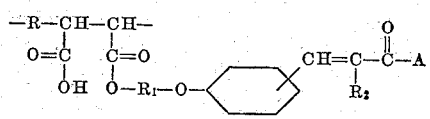

wherein R represents a member selected from the group consisting of a styrene unit, a vinyl ester unit, an isopropenyl ester unit, an alkyl acrylate unit, an alkyl methacrylate unit, a vinyl alkyl ether unit and an ethylene unit and wherein in each instance the alkyl group contains from 1 to 4 carbon atoms, $R_1$ represents an alkylene group containing from 2 to 3 carbon atoms, $R_2$ represents a member selected from the group consisting of an atom of hydrogen, an alkyl group containing from 1 to 4 carbon atoms, a nitro group, a cyano group and a —$COOR_4$ group, and A represents a monovalent group selected from the group consisting of an —OH group, a —$R_4$ group, an —$OR_4$ group, a —$COOR_4$ group, a —CH=CH—C$_6$H$_4$—OR$_4$ group, a —C$_6$H$_4$—C$_6$H$_5$ group and the group

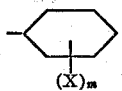

wherein $m$ is a whole number of from 1 to 2 and X represents a member selected from the group consisting of a hydrogen atom, a halogen atom, a nitro group, a cyano group, an —R$_4$ group, an —OR$_4$ group, a —COOH group, a —COOR$_4$ group, a —CONH$_2$ group and an

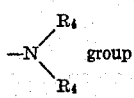

and wherein R$_4$ in each instance represents an alkyl group containing from 1 to 4 carbon atoms, the remainder of the molecule to make a total of 100% being composed of the recurring structural unit:

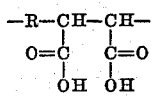

wherein R has the above definition.

2. A resinous polymer consisting of from about 20% to substantially 100% by weight of the recurring structural unit:

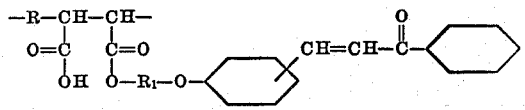

wherein R represents a member selected from the group consisting of a styrene unit, a vinyl ester unit, an isopropenyl ester unit, an alkyl acrylate unit, an alkyl methacrylate unit, a vinyl alkyl ether unit and an ethylene unit and wherein in each instance the alkyl group contains from 1 to 4 carbon atoms, and R$_1$ represents an alkylene group of from 2 to 3 carbon atoms, the remainder of the molecule to make a total of 100% being composed of the recurring structural unit:

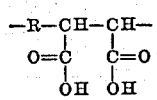

wherein R has the above definition.

3. A resinous polymer consisting of from about 20% to substantially 100% by weight of the recurring structural unit:

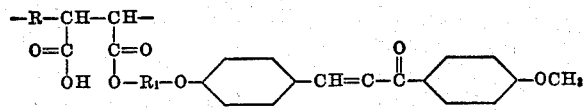

wherein R represents a member selected from the group consisting of a styrene unit, a vinyl ester unit, an isopropenyl ester unit, an alkyl acrylate unit, an alkyl methacrylate unit, a vinyl alkyl ether unit and an ethylene unit and wherein in each instance the alkyl group contains from 1 to 4 carbon atoms, and R$_1$ represents an alkylene group of from 2 to 3 carbon atoms, the remainder of the molecule to make a total of 100% being composed of the recurring structural unit:

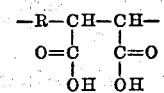

wherein R has the above definition

4. A resinous polymer consisting of from about 20% to substantially 100% by weight of the recurring structural unit:

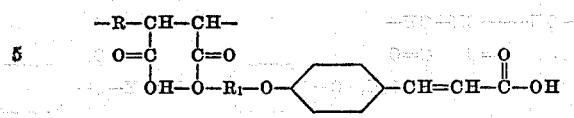

wherein R represents a member selected from the group consisting of a styrene unit, a vinyl ester unit, an isopropenyl ester unit, an alkyl acrylate unit, an alkyl methacrylate unit, a vinyl alkyl ether unit and an ethylene unit and wherein in each instance the alkyl group contains from 1 to 4 carbon atoms, and R$_1$ represents an alkylene group of from 2 to 3 carbon atoms, the remainder of the molecule to make a total of 100% being composed of the recurring structural unit:

wherein R has the above definition.

5. A resinous polymer consisting of from about 20% to substantially 100% by weight of the recurring structural unit:

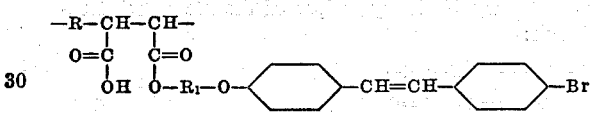

wherein R represents a member selected from the group consisting of a styrene unit, a vinyl ester unit, an isopropenyl ester unit, an alkyl acrylate unit, an alkyl methacrylate unit, a vinyl alkyl ether unit and an ethylene unit and wherein in each instance the alkyl group contains from 1 to 4 carbon atoms, and R$_1$ represents an alkylene group of from 2 to 3 carbon atoms, the remainder of the molecule to make a total of 100% being composed of the recurring structural unit:

wherein R has the above definition.

6. A resinous polymer consisting of from about 20% to substantially 100% by weight of the recurring structural unit:

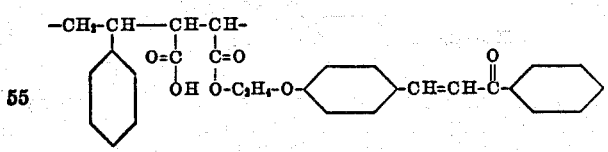

the remainder of the molecule to make a total of 100% being recurring hydrolyzed 1:1 styrene/maleic anhydride copolymer units.

7. A resinous polymer consisting of from about 20% to substantially 100% by weight of the recurring structural unit:

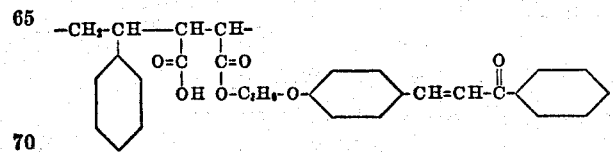

the remainder of the molecule to make a total of 100% being recurring hydrolyzed 1:1 styrene/maleic anhydride copolymer units.

8. A resinous polymer consisting of from about 20% to substantially 100% by weight of the recurring structural unit:

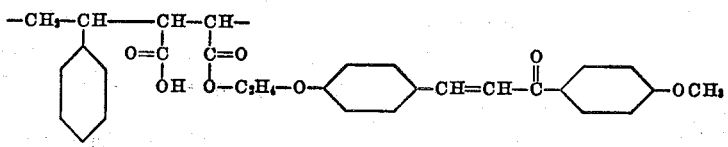

the remainder of the molecule to make a total of 100% being recurring hydrolyzed 1:1 styrene/maleic anhydride copolymer units.

9. A resinous polymer consisting of from about 20% to substantially 100% by weight of the recurring structural unit:

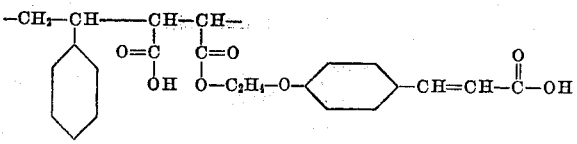

the remainder of the molecule to make a total of 100% being recurring hydrolyzed 1:1 styrene/maleic anhydride copolymer units.

10. A resinous polymer consisting of from about 20% to substantially 100% by weight of the recurring structural unit:

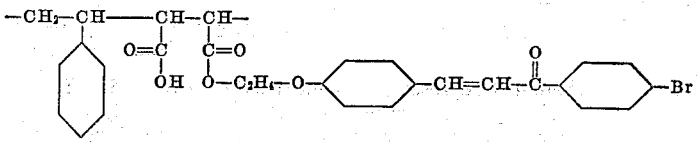

the remainder of the molecule to make a total of 100% being recurring hydrolyzed 1:1 styrene/maleic anhydride copolymer units.

11. A process for preparing an esterified copolymer of maleic anhydride containing about from 20% to substantially 100% by weight of combined ester groups which comprises reacting a maleic anhydride copolymer represented by the following recurring structural unit:

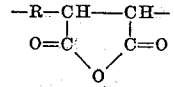

with a hydroxyl group containing compound having the following general formula:

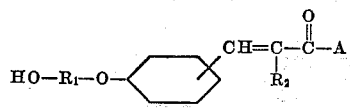

wherein R represents a member selected from the group consisting of a styrene unit, a vinyl ester unit, an isopropenyl ester unit, an alkyl acrylate unit, an alkyl methacrylate unit and an ethylene unit and wherein in each instance the alkyl group contains from 1 to 4 carbon atoms, $R_1$ represents an alkylene group containing from 2 to 3 carbon atoms, $R_2$ represents a member selected from the group consisting of an atom of hydrogen, an alkyl group containing from 1 to 4 carbon atoms, a nitro group, a cyano group and a —$COOR_4$ group, and A represents a member selected from the group consisting of an —OH group, a —$OR_4$ group, a —$COOR_4$ group, a

—CH=CH—$C_6H_4$—$OR_4$ group, a —$C_6H_4$—$C_6H_5$ group and the group

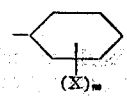

wherein $m$ is a whole number of from 1 to 2 and X represents a member selected from the group consisting of a hydrogen atom, a halogen atom, a nitro group, a cyano group, an —$R_4$ group, an —$OR_4$ group, a —COOH group, a —$COOR_4$ group, a —$CONH_2$ group and an $$-N\diagdown_{R_4}^{R_4} \text{group}$$

and wherein $R_4$ in each instance represents an alkyl group containing from 1 to 4 carbon atoms, in the proportions of from about 0.10–1.50 moles of the said hydroxyl group containing compound to each mole of the said maleic anhydride copolymer.

12. A process for preparing an esterified copolymer of maleic anhydride containing about from 20% to substantially 100% by weight of combined ester groups which comprises reacting a maleic anhydride polymer represented by the following recurring structural unit:

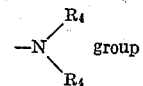

wherein R represents a member selected from the group consisting of a styrene unit, a vinyl ester unit, an isopropenyl ester unit, an alkyl acrylate unit, an alkyl methacrylate unit and an ethylene unit and wherein each instance the alkyl group contains from 1 to 4 carbon atoms, with 4-hydroxyethoxybenzalacetophenone, in the proportions of from 0.10–1.50 moles of the said 4-hydroxyethoxybenzalacetophenone to each mole of the said polymer.

13. A process for preparing an esterified copolymer of maleic anhydride containing about from 20% to substantially 100% by weight of combined ester groups which comprises reacting a maleic anhydride polymer represented by the following recurring structural unit:

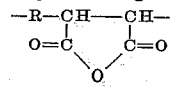

wherein R represents a member selected from the group consisting of a styrene unit, a vinyl ester unit, an isopropenyl ester unit, an alkyl acrylate unit, an alkyl methacrylate unit and an ethylene unit and wherein in each instance the alkyl group contains from 1 to 4 carbon atoms, with 4-hydroxypropoxybenzalacetophenone in the proportions of from 0.10–1.50 moles of the said 4-hydroxypropoxybenzalacetophenone to each mole of the said polymer.

14. A process for preparing an esterified copolymer of maleic anhydride containing about from 20% to substantially 100% by weight of combined ester groups which comprises reacting a maleic anhydride polymer represented by the following recurring structural unit:

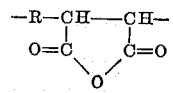

wherein R represents a member selected from the group consisting of a styrene unit, a vinyl ester unit, an isopropenyl ester unit, an alkyl methacrylate unit and an ethylene unit and wherein in each instance the alkyl group contains from 1 to 4 carbon atoms, with 4-hydroxyethoxybenzalanisalacetone, in the proportions of from 0.10 to 1.50 moles of the said 4-hydroxyethoxybenzalanisalacetone to each mole of the said polymer.

15. A process for preparing an esterified copolymer of maleic anhydride containing about from 20% to substantially 100% by weight of combined ester groups which comprises reacting a maleic anhydride copolymer represented by the following recurring structural unit:

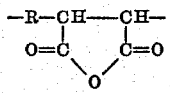

wherein R represents a member selected from the group consisting of a styrene unit, a vinyl ester unit, an isopropenyl ester unit, an alkyl acrylate unit, an alkyl methacrylate unit and an ethylene unit and wherein in each instance the alkyl group contains from 1 to 4 carbon atoms, with 4-hydroxyethoxy cinnamic acid, in the proportions of from 0.10–1.50 moles of the said 4-hydroxyethoxy cinnamic acid to each mole of the said polymer.

16. A process for preparing an esterified copolymer of maleic anhydride containing about from 20% to substantially 100% by weight of combined ester groups which comprises reacting a maleic anhydride polymer represented by the following recurring structural unit:

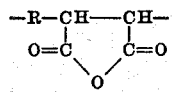

wherein R represents a member selected from the group consisting of a styrene unit, a vinyl ester unit, an isopropenyl ester unit, an acrylate unit, an alkyl methacrylate unit and an ethylene unit and wherein in each instance the alkyl group contains from 1 to 4 carbon atoms, with 4 - hydroxyethoxybenzal - 4' - bromoacetophenone, in the proportions of from 0.10 to 1.50 moles of the said 4-hydroxyethoxybenzal-4'-bromoacetophenone to each mole of the said polymer.

References Cited in the file of this patent
UNITED STATES PATENTS

| | | |
|---|---|---|
| 2,554,959 | Rowland | May 23, 1951 |
| 2,706,725 | Unruh et al. | Apr. 19, 1955 |
| 2,716,102 | Unruh et al. | Aug. 23, 1955 |
| 2,728,745 | Smith et al. | Dec. 27, 1955 |

FOREIGN PATENTS

| | | |
|---|---|---|
| 479,838 | Great Britain | Feb. 11, 1938 |